Sept. 11, 1956     I. MORSE     2,762,079
DENTAL REPAIR PRESS
Filed Aug. 12, 1953     2 Sheets-Sheet 2
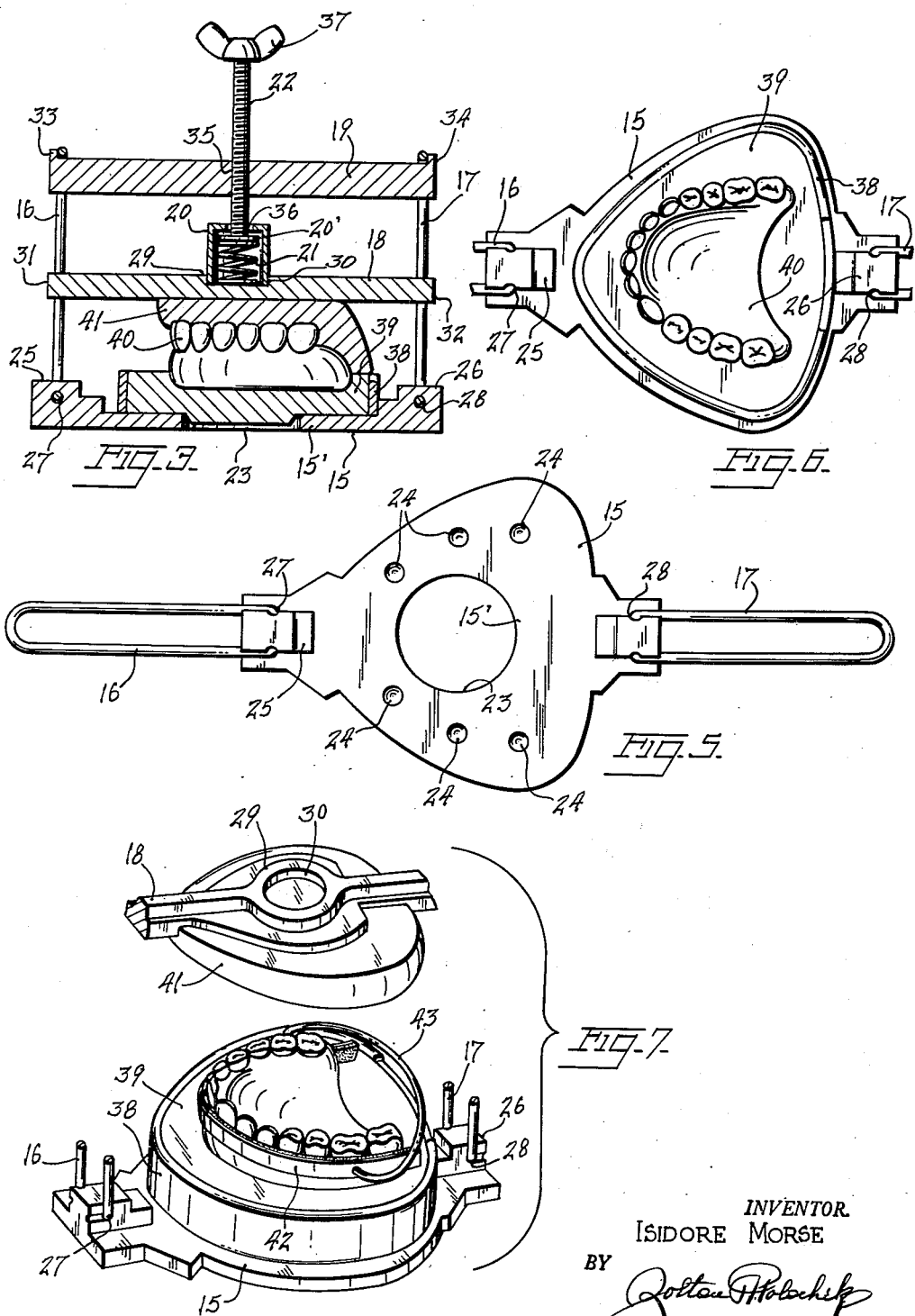
INVENTOR.
ISIDORE MORSE
ATTORNEY

United States Patent Office 2,762,079
Patented Sept. 11, 1956

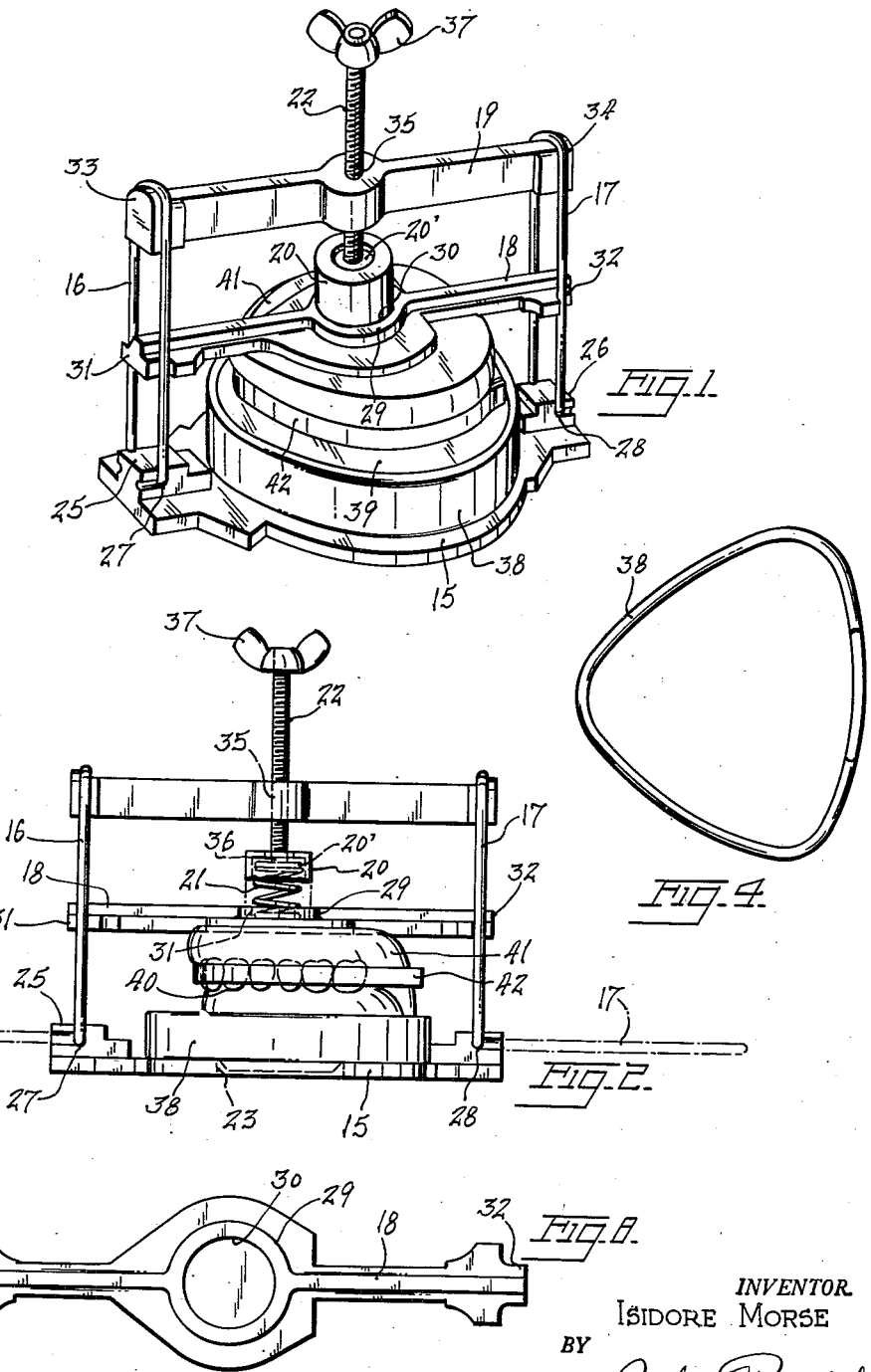

2,762,079
DENTAL REPAIR PRESS
Isidore Morse, Bronx, N. Y.

Application August 12, 1953, Serial No. 373,803

1 Claim. (Cl. 18—33)

This invention relates to new and useful improvements in dental presses and in methods of repairing broken dental plates, jacket crowns, base plates, bridges, small partial plates, and the like.

More particularly, the present invention proposes the construction of an improved dental press which can be used quickly and conveniently for all dental press purposes, both in making and repair work.

Still further, the present invention proposes constructing the dental press so that it can be readily assembled and disassembled and compact in either condition.

As a further object, the present invention proposes constructing the dental press with a spring biasing and safety member so that various degrees of pressure may be applied merely by turning a screw member operatively connected with the spring member.

The present invention further proposes a novel method of repairing dental plates by the use of a dental press such as the improved dental press of the present invention.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of the dental press of the present invention assembled and illustrating one use.

Fig. 2 is a side elevational view of the dental press illustrating the method of repairing a broken dental plate, hidden parts being shown in dotted outline and the lower portion of the side clamping members being shown in dot-dash outline.

Fig. 3 is a central sectional view of the structure shown in Fig. 2.

Fig. 4 is a top plan view of the former shown in Figs. 2 and 3.

Fig. 5 is a top plan view of the base member of the dental press.

Fig. 6 is an enlarged fragmentary view similar to Fig. 5 but also showing the lower half of the plaster mold and the shell tray.

Fig. 7 is a perspective fragmentary view of the base member with the lower half of the plaster mold resting thereon, a broken dental plate held together by wax and wood splint and having its teeth masked by rubber resting on the lower half of the plaster mold, and the upper half of the plaster mold above the broken dental plate.

Fig. 8 is a top plan view of the pressure plate shown in Figs. 1, 2 and 3.

Referring more particularly to the drawings, the dental press of the present invention has a base plate 15 with a pair of spaced U-shaped loop clamp members 16 and 17 pivotally secured to it, a pressure plate 18, a crossbar or beam member 19, a removable cup-shaped bearing plate holder 20 with a coil spring 21 therein against a bearing plate 20' and extending from holder 20, and a threaded rod or screw member 22. All these parts preferably are made of metal. Bearing plate 20' is freely movable in the cup-shaped bearing plate holder 20.

Base plate 15 has a central portion 15' with a plaster engaging opening 23 therein and plaster receiving recesses 24 (see Fig. 5) spaced around the opening 23. The base plate 15 also has lug portions 25 and 26 raised on it. The lug portions 25 and 26 contain side openings 27 and 28 pivotally to receive and hold the two ends of each of the U-shaped loop clamp members 16 and 17. In this manner the loop clamp members 16 and 17 are pivotally connected to the base plate 15 so that they can be raised vertically above the base plate at each side thereof or can be lowered flat or horizontal in the same plane as the base plate.

Pressure plate 18 has a central portion 29, which contains a recess 30 in which a spring 21 extends to the top of recess 30 within a cup-shaped bearing plate holder 20. Pressure plate 18 also has end portions 31 and 32 which slidably extend through the loop guide members 16 and 17, respectively, when these guide members 16 and 17 are raised into the vertical position shown in Figs. 1, 2 and 3. In this manner, the pressure plate 18 is slidably engageable with the guide members 16 and 17 for disposal over the base plate 15 and movable toward and away from the base plate.

Beam member 19 has end portions 33 and 34 similarly engageable as the end portions 31 and 32 of pressure plate 18 with the guide members 16 and 17, respectively. In addition, beam member 19 has a threaded opening 35 through it for thread rod or screw member 22 to pass through so that the lower end 36 of the screw member 22 may engage and bear against bearing plate 20'. The screw member 22 has a wing nut 37 fixed to its upper end for gripping in turning the screw. In this manner the lower end 36 of the screw member 22 is removably connected with the pressure plate 18 to force it toward the base plate 15 as the screw member is turned.

Spring 21, as shown, is removably mounted in the pressure plate holder 20 with its upper end abutting the freely floating pressure plate 20' in holder 20. The bottom portion of holder 20 is frictionally held in the recess 30 and merely acts as a housing for the spring 21 and plate 20'. However, different springs 21 of varying strength may be put in the cup-shaped pressure plate holder 20 as desired to vary the degree of pressure exerted by the pressure plate 20'. The threads on the screw member 22 and the strength of the spring 21 may be selected to give predetermined degrees of pressure depending on the extent to which the screw member is turned.

The operation of the dental press and the new method of repairing broken dental plates will now be set forth. A former 38 (see Figs. 2, 3 and 4) is placed on the base 15' of base plate 15 of the dental press and entirely filled with plaster or cement 39. A broken dental plate 40 is temporarily mended with wax, filled with the same mixture of plaster or cement 39 and placed on top of the plaster 39 in the former or tray 38, and when hard, the wax is removed.

The teeth of the broken dental plate 40 may be masked by a rubber strip 42 (see Fig. 7) to keep off plaster, the strip 42 being held by wire clamp 43 until the upper plaster 41 is poured, the wire clamp 43 being removed when the plaster has hardened. A new mixture of plaster or cement 41 is made and poured on the plate covering the palate and cusps of the teeth and, while still soft, the central portion 29 of pressure plate 18 is placed over the assembly so that plaster mold 41 will adhere to the pressure plate and be thereby kept in place.

The loop clamp members or arms 16 and 17 are then raised vertically on their pivots and fit over the end portions 31 and 32 of the pressure plate 18 to adjust the pressure plate in proper position before the plaster hardens. Then the plaster is left in the device to harden.

When the plaster molds 39 and 41 have hardened, the loop clamp members or arms 16 and 17 are lowered to take off the masking 42. Member 41 and pressure plate 18 are pried open and removed together or as one unit from the lower broken dental plate 40. The parts of the repaired plate are then removed and edges of the broken part ground and then replaced on the lower plaster 39.

A self-curing or other plastic requiring heat or no heat for setting, is placed on the crack of the broken dental plate 40. The end portions 33 and 34 of the beam member 19 are then inserted through the upstanding loop guide members 16 and 17 and the spring 21 covered by bearing plate 20' is placed in the recess 30 in the pressure plate holder 20. The screw member 22 through the beam member 19 is then screwed until its lower end 36 engages and bears against the bearing plate 20'. This forces the end portions 33 and 34 of the beam member 19 against the bent crooks of the loop guide members 16 and 17. In this manner, any degree of pressure desired may be put on the plaster molds 39 and 41.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A dental press comprising a base plate, a pair of spaced opposed loop guide members each pivotally secured at the straight ends to the base plate, a pressure plate having recessed end portions adapted to extend slidably through and interlock with the loop guide members when said members are raised into vertical position, a beam member having end portions adapted to extend similarly through the loop guide members and retain the looped ends thereon when such guide members are raised into vertical position and to seat against the loop bends at the upper limits of travel, said beam member having a central opening, a screw member extending perpendicular through the central opening in the beam member with a lower end removably and operatively connected with the pressure plate to bias it toward the base plate as the screw member is screwed downwardly, said base plate and pressure plate having aligning central portions with a plaster engaging opening disposed centrally in the central portion of the base plate, said screw member being disposed in the beam member for vertical alignment with the central portions of the base and pressure plates when the beam member end portions are extending through the loop guide members.

References Cited in the file of this patent

UNITED STATES PATENTS

| | | |
|---|---|---|
| 861,598 | Moscovitz | July 30, 1907 |
| 1,165,937 | Booty | Dec. 28, 1915 |
| 2,320,826 | Mandel | June 1, 1943 |
| 2,397,264 | Ingersoll | Mar. 26, 1946 |
| 2,471,501 | Steigleman | May 31, 1949 |
| 2,551,812 | Nelson | May 8, 1951 |

FOREIGN PATENTS

| | | |
|---|---|---|
| 267,808 | Switzerland | Apr. 15, 1950 |
| 460,291 | Italy | Nov. 13, 1950 |